Patented June 16, 1925.

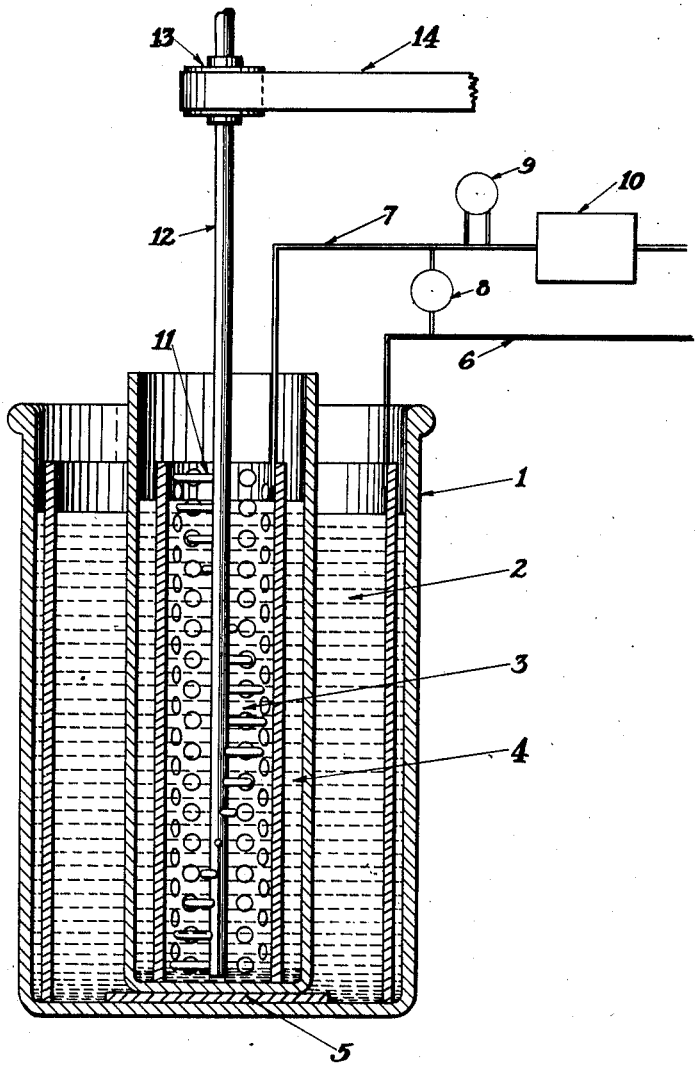

1,542,265

UNITED STATES PATENT OFFICE.

JAMES F. NORRIS AND EDMUND O. CUMMINGS, OF CAMBRIDGE, MASSACHUSETTS.

PROCESS OF MAKING AMINOSALICYLIC ACID.

Application filed October 20, 1922. Serial No. 595,753.

*To all whom it may concern:*

Be it known that we, JAMES F. NORRIS and EDMUND O. CUMMINGS, citizens of the United States, residing at Cambridge, in the county of Middlesex and State of Massachusetts, have invented certain new and useful Improvements in Processes of Making Aminosalicylic Acid, of which the following is a specification.

This invention relates to a process of reducing azo compounds and has particular application to the reduction of the aryl azo acids into corresponding amino acids.

One of the objects of this invention is to reduce an azo compound with $TiCl_3$, for example benzene-azo-salicylic acid,

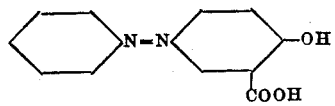

to form aminosalicylic acid hydrochloride. A still further object of this invention is to provide a cyclic process whereby the $TiCl_3$, which during the reduction becomes oxidized, is again converted into $TiCl_3$. The $TiCl_3$ used for reduction is dispersed in an inorganic acid, such as HCl or $H_2SO_4$, wherein it is wholly or in part in solution or suspension.

In carrying out the reduction a solution of $TiCl_4$ in substantially concentrated HCl is electrolytically reduced, forming $TiCl_3$. During this electrolysis there is a tendency for titanic acid to be precipitated if the concentration of the HCl is too low, and since it is desired to avoid this precipitation the HCl should be of high concentration.

An apparatus which has been found suitable for carrying out this reduction is illustrated, more or less diagrammatically, in the accompanying drawing. The apparatus comprises a vessel (1) of material capable of resisting the action of the electrolytes, such as glass, the anode (2) and the cathode (3). The electrodes are made of material which will not be attacked during the electrolysis. For the cathode, carbon or graphite has been found satisfactory, while carbon, graphite, and metals such as lead, which are not attacked, have been found suitable for the anode. The apparatus shows the use of the porous cup (4), preferably of unglazed porcelain, which acts as a diaphragm, and surrounds the cathode (3) and is positioned upon the plate (5) at the bottom of the vessel (1). Other well known types of diaphragms may be used in lieu of the unglazed porcelain cup. The leads (6) and (7) are connected to the electrodes, and the apparatus is provided with the voltmeter (8), ammeter (9) and adjustable resistance (10) whereby the current passing through the cell may be determined and regulated. The apparatus may also be provided with a stirrer (11) operated by the shaft (12), pulley (13) and belt 14).

A specific example of carrying out the reduction of the $TiCl_4$ solution is as follows: A concentrated solution of about 150 c. c. $TiCl_4$ is added to about 600 c. c. of concentrated HCl and placed in the compartment containing a cathode of carbon. In the compartment containing an anode of lead the dilute solution of $H_2SO_4$ (about 5%) is used. The reduction may be carried out at room temperature, or even below room temperature, but by raising the temperature the cathodic current density may be increased without causing evolution of hydrogen, thereby reducing the time required for the reduction of a given amount of $TiCl_4$. For example, when operating at 55° C. the current density may be increased over 200% above that used when operating at about 22° C., without causing evolution of hydrogen. In carrying out the reduction at ordinary room temperature a cathodic current density of about 7 amperes per sq. decimeter may be employed and if the operation is carried on at 55–70° C., the current density may be from 9–23 amperes per sq. decimeter, with a voltage across the cell of about 4 volts. The heating effect of the current causes a rise in temperature to 60–70° C. The reduced solution is analyzed in order to determine the equivalent amount for a given quantity of benzene-azo-salicylic acid in reducing the latter to aminosalicylic acid hydrochloride.

When the reduction is finished, the solution containing the $TiCl_3$ is removed from the cathode chamber to a closed vessel and then mixed with the finely ground benzene-azo-salicylic acid, using a slight excess $TiCl_3$ solution beyond that necessary for complete reduction of the benzene-azo-salicylic acid in order to make certain that all of the benzene-azo-salicylic acid will be reduced. The mixture is, preferably, allowed to stand over night in the closed vessel and kept stirred. If it is desired to carry on the reduction in a non-oxidizing atmosphere, a current of $CO_2$ may also be passed through the solution. It is then heated to boiling in order to complete the reduction.

After boiling the solution is cooled and filtered in order to remove the bulk of aminosalicylic acid hydrochloride and the filtrate is then treated with HCl gas which concentrates the HCl solution and precipitates more aminosalicylic acid hydrochloride and aniline hydrochloride, which are removed by filtration. This saturation of the cold solution with HCl gas is continued until a specific gravity of about 1.19 is reached. The resulting filtrate may now be electrolytically reduced to regenerate $TiCl_3$. Over 95% of the original $TiCl_3$ is usually recovered.

The above precipitate containing the aminosalicylic acid hydrochloride and aniline hydrochloride is then combined with the bulk of aminosalicylic acid hydrochloride first obtained and then washed with water which dissolves the aniline hydrochloride, leaving the aminosalicylic acid hydrochloride. The wash liquor may be used in the preparation of benzene-azo-salicylic acid, thus recovering all aniline hydrochloride.

The aminosalicylic acid hydrochloride is then treated with an alkaline solution in slight excess, and the excess is just neutralized with HCl which will produce the aminosalicylic acid.

This process is very efficient and yields of more than 94% of the theoretical amount of aminosalicylic acid have been obtained. The purity of the product is above 80% of the theoretical.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. In a process of preparing an amino acid from a corresponding aryl azo acid, reducing the latter by means of a $TiCl_3$ solution.

2. In a process of preparing an amino acid from a corresponding aryl azo acid, reducing the latter by means of $TiCl_3$ dissolved in concentrated acid.

3. In a process of preparing an amino acid from a corresponding aryl azo acid, reducing the latter by means of an excess of $TiCl_3$ dissolved in concentrated acid.

4. In a process of preparing an amino acid from a corresponding aryl azo acid, treating the latter with a $TiCl_3$ solution and then boiling the resulting composition.

5. In a process of preparing an amino acid from a corresponding aryl azo acid, treating the latter with an excess of acidified $TiCl_3$ solution and then boiling the resulting composition.

6. In a process of preparing aminosalicylic acid, reducing benzene-azo-salicylic acid by means of $TiCl_3$.

7. In a process of preparing aminosalicylic acid, reducing benzene-azo-salicylic acid by means of $TiCl_3$ dissolved in concentrated acid.

8. In a process of preparing aminosalicylic acid, reducing benzene-azo-salicylic acid by means of an excess of $TiCl_3$ dissolved in concentrated acid.

9. In a process of preparing aminosalicylic acid, treating benzene-azo-salicylic acid with a $TiCl_3$ solution and then boiling the resulting composition.

10. In a process of preparing aminosalicylic acid, treating benzene-azo-salicylic acid with an acidified $TiCl_3$ solution and then boiling the resulting composition.

11. In a process of preparing aminosalicylic acid, reducing benzene-azo-salicylic acid by means of a $TiCl_3$ solution and then precipitating dissolved aminosalicylic acid hydrochloride with HCl.

12. In a process of preparing aminosalicylic acid, reducing benzene-azo-salicylic acid by means of an excess of acidified $TiCl_3$ solution and then precipitating dissolved amino-salicylic acid hydrochloride with HCl.

13. In a process of preparing aminosalicylic acid, treating benzene-azo-salicylic acid with a $TiCl_3$ solution, then boiling the resulting composition and then precipitating dissolved aminosalicylic acid hydrochloride with HCl.

14. In a process of preparing aminosalicylic acid, treating benzene-azo-salicylic acid with an acidified $TiCl_3$ solution, then boiling the resulting composition and then precipitating dissolved aminosalicylic acid hydrochloride with HCl.

In testimony whereof we affix our signatures.

JAMES F. NORRIS.
EDMUND O. CUMMINGS.